(12) United States Patent
Subhan

(10) Patent No.: US 8,660,892 B2
(45) Date of Patent: Feb. 25, 2014

(54) COUPON GENERATION AND REDEMPTION SYSTEM

(75) Inventor: Rehan Subhan, Eden Prairie, MN (US)

(73) Assignee: KPS LLC, River Falls, WI (US)

(*) Notice: Subject to any disclaimer, the term of this patent is extended or adjusted under 35 U.S.C. 154(b) by 0 days.

(21) Appl. No.: 13/308,451

(22) Filed: Nov. 30, 2011

(65) Prior Publication Data

US 2012/0136709 A1     May 31, 2012

Related U.S. Application Data

(63) Continuation of application No. 12/266,691, filed on Nov. 7, 2008.

(60) Provisional application No. 60/986,285, filed on Nov. 7, 2007.

(51) Int. Cl.
*G06Q 30/00*     (2012.01)

(52) U.S. Cl.
USPC ........................................................ 705/14.1

(58) Field of Classification Search
USPC ........................................................ 705/14.1
See application file for complete search history.

(56) References Cited

U.S. PATENT DOCUMENTS 6,151,587 A    11/2000   Matthias
6,932,270 B1 *   8/2005   Fajkowski .................... 235/383

OTHER PUBLICATIONS

Pfister, Stefan Lawrence. U.S. Appl. No. 12/266,691, filed Nov. 7, 2008. "Coupon Generation and Redemption System".

\* cited by examiner

*Primary Examiner* — Daniel Lastra
(74) *Attorney, Agent, or Firm* — Dicke, Billig & Czaja, PLLC

(57) ABSTRACT

A coupon generation and redemption method that includes displaying on a video display associated with a computing device at least one product on which at least one promotion is available. An input device that is associated with the computing device is used to select at least one of the at least one product for which the consumer desires to receive at least one coupon. The at least one coupon is printed using the computing device. The at least one product referenced in the at least one coupon is purchased. The at least one coupon is redeemed.

17 Claims, 1 Drawing Sheet

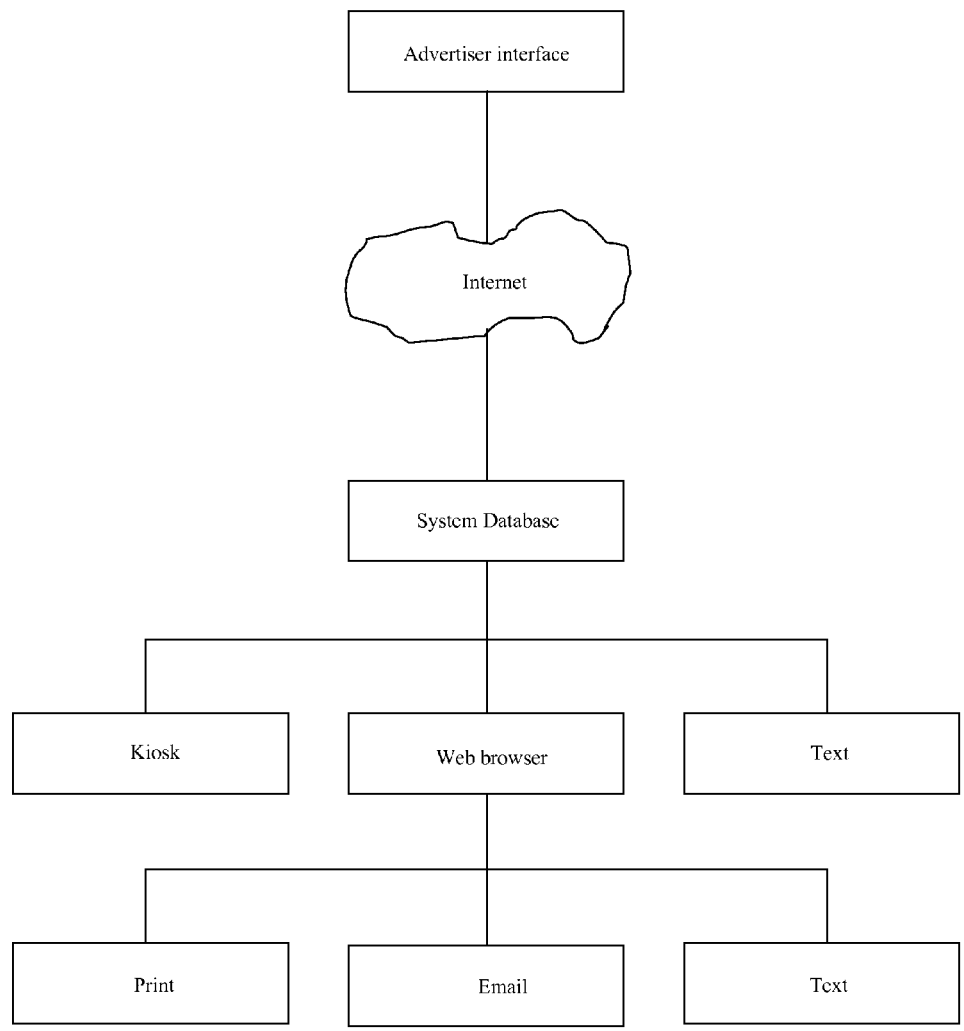

COUPON GENERATION AND REDEMPTION SYSTEM

REFERENCE TO RELATED APPLICATION

This application claims priority to U.S. Application Ser. No. 12/266,691, filed Nov. 7, 2008, and U.S. Provisional Applic. No. 60/986,285, filed Nov. 7, 2007, the contents of which are incorporated herein by reference.

FIELD OF THE INVENTION

The invention relates generally to coupons. More particularly, the invention relates to a coupon generation and redemption system.

BACKGROUND OF THE INVENTION

One of the promotional techniques used by manufacturers and retailers to encourage the purchase of particular products is coupons. Coupons typically offer a monetary discount on the specified product.

There are two types of coupons—manufacturer coupons and store coupons. Manufacturer coupons are distributed by the manufacturer of a particular product and are redeemable by consumers at a variety of retailers that sell the specified products. Store coupons in contrast are distributed by a particular store and may only be redeemed at the specified store.

While store coupons are processed by the store where redeemed, manufacturer coupons are typically processed by a coupon clearinghouse that sort the coupons for particular manufacturers and then submit the data to the manufacturers requesting payment for the coupons along with a processing fee being submitted to the retailers.

SUMMARY OF THE INVENTION

An embodiment of the invention is directed to a coupon generation and redemption system that not only enhances the incentives for the consumer to redeem the coupon but also reduces the costs associated with processing the redeemed coupon and reduces fraud associated with coupon redemption.

BRIEF DESCRIPTION OF THE DRAWINGS

The accompanying drawings are included to provide a further understanding of embodiments and are incorporated in and constitute a part of this specification. The drawings illustrate embodiments and together with the description serve to explain principles of embodiments. Other embodiments and many of the intended advantages of embodiments will be readily appreciated as they become better understood by reference to the following detailed description. The elements of the drawings are not necessarily to scale relative to each other. Like reference numerals designate corresponding similar parts.

The sole FIGURE is a schematic view of a coupon generation and redemption system according to an embodiment of the invention.

DETAILED DESCRIPTION OF THE PREFERRED EMBODIMENTS

The invention is directed to a coupon generation and redemption system. The coupon generation and redemption system enables stores and manufacturers to increase the efficiency and decrease fraud associated with coupon generation and redemption.

In contrast to manufacturer coupons, the coupon generation and redemption system generates coupons that may only be redeemable at the store (or chain) in which it was issued. This system thereby supports the product manufacturer objective to limit or target promotional dollars to a specific retail account. Since the coupons cannot be redeemed at other stores, the coupon generation and redemption system provides exclusivity to the retail store (or chain).

Coupons produced using the coupon generation and redemption system may have a different look and feel than manufacturer coupons and store coupons. Since the coupons are typically only valid at a particular store, the name of the store may be printed on the coupon.

Such a process would reduce the potential of consumers believing that the coupons could be redeemed at other stores. When the consumer attempts to redeem the coupon at a store other than the store where the coupon is intended to be redeemed, the consumer may exhibit frustration towards the store and the product manufacturer when the consumer is unable to redeem such coupons even if the consumer was in error in believing that the coupon could be redeemed at that store.

Additionally, when the consumer redeems the coupon at the incorrect store, such store may inadvertently honor the coupons that are not intended to be redeemed at these stores. When the retailer redeems a coupon at a store other than the store that the advertiser intended the coupon to be redeemed at may present a problem for the retailer because the store may not be able to be reimbursed for the value of such coupons.

To aid the consumer in locating the product referenced on the coupon in the store, the location of the item in the store such as the aisle may be printed on the coupons produced using the coupon generation and redemption system.

The coupons produced using the coupon generation and redemption system may be produced proximate to the time when the consumer will be shopping for the products identified in the coupons. For example, the coupons may be produced using a kiosk that is located inside of or adjacent to the retail store where the coupons will be used. One such system is described in U.S. Pat. No. 6,151,587, which is assigned to the assignee of the present patent application.

Using such a kiosk in conjunction with the coupon generation and redemption system enables the coupons to be frequently changed based upon a variety of factors such as the day of the week, the time of day and the weather. The consumer also interacts with the kiosk just prior to the consumer selecting products and thereby has the potential of increasing the influence of the consumer's purchasing selections.

Alternatively, the coupon generation and redemption system may be implemented using other techniques such as selecting and printing the coupons on a home or office computer such as by accessing a website using the internet or other computer network.

It is also possible to generate the coupons on a mobile computing device, an example of which is a mobile communication device. Examples of other mobile computing devices on which the coupons may be generated include mobile telephones, smart telephones, tablet computers and notebook computers.

Because of factors such as the size, form factor and resolution differences between the various mobile computing devices, the coupon generation and redemption system may sense the mobile computing device that is being used and then adapt the coupon such that the level of detail and format of the coupon is optimized.

For example, when the mobile computing device is a tablet computer, more information may be provided than when the mobile computing device is a smart telephone with a considerably smaller screen and possibly a lower screen resolution.

Because mobile computing devices may not have an output device such as a printer associated therewith, the system may enable the customer to redeem the coupons without printing the coupons. An example of one such configuration that enables the coupons to be redeemed without printing is via a bar code. It is also possible to provide the consumer with a code that includes at least one alpha and/or numeric character.

When it is desired to redeem the coupon, the bar code may be scanned at the location where the coupon is intended to be redeemed and the associated product is desired to be purchased such as using a point of sale system.

Alternatively, the customer may enter the alpha and/or numeric characters that comprise the code into an input device that is proximate the point of sale system. Alternatively or additionally, the customer may provide the code to a person who is associated with the entity where it is desired to redeem the coupon.

The code may be provided to the customer using a variety of techniques. Examples of these techniques include downloading or otherwise receiving using the internet. Another technique that may be used for delivering the code associated with the coupon to the customer is via an email or text message. The code associated with the coupon may also be delivered to the customer via an application that is installed on the mobile computing device.

The code may be downloaded by the customer in real-time or the code may be stored on the mobile computing device that is used by the customer. An advantage of downloading the code in real-time is that the code may be updated based upon when the customer desires to use the coupon.

An advantage of storing the code on the mobile computing device is that the customer would be able to use the coupon even when the customer is not able to have access to the database associated with the coupon generation and redemption system.

The code may be encrypted so that the code cannot be modified by the user such as to change the time period when the code is valid or to change other aspects of the coupon such as the amount of the discount provided and the products that must be purchased to receive the discount.

Yet another technique for utilizing the coupon generation and redemption system is via web browser data that is stored in memory or cache on the computing device. Such a configuration may be particularly useful for use by persons who may not have authorization to install applications on the computing device.

Such authorization limits may originate from the person or entity that owns or maintains the computer to thereby protect the computer such as from becoming infected by a computer virus.

The authorization limits may also relate to restrictions that are utilized by the entity that produced the software or hardware of the computing device. For example, users can only install applications on iPod computing devices through the iTunes market and the software available through the iTunes market is controlled by Apple Inc. The intent of such a system may be to ensure that the company receives a commission from the sale of such computer software.

The data that is store on the computing device may be encrypted or otherwise protected such that the data can only be used on the computing device on which the data was downloaded. The encryption may also be used to ensure that the data is only accessible for limited periods of time. Such a configuration may be a supplement to the expiration dates that are included in the coupons that are generated by the coupon generation and redemption system.

The coupons may be formatted for viewing on a variety of web browsers because the browsers are generally adapted for viewing information from a variety of sources. The coupon generation and redemption system may be adapted to sense the particular web browser being used by the customer such that the coupons may be optimized for the particular web browser Yet another technique for redeeming the coupon is to associate the coupon with a card such as a credit card, debit card or an affinity card. Generating the coupon in this manner would enable the coupon to be redeemed when the card to which the coupon is associated is processed during the purchase of the product referenced in the coupon.

While associating the coupons with a credit card, debit card or an affinity card may enhance the ability for the customer to use the coupons, it may be desirable for the customer to be able to view the available coupons while the customer is shopping for products in the store so that the customer does not forget to purchase one of the products.

In such situations, there may be advantages of customer having the coupons printed on a piece of paper or visible on a screen of a mobile computing device that is being held by the customer while the customer is shopping for the products.

The coupon generation and redemption system may interact with an affinity card, a debit card or a credit card such that the coupons presented to the consumer are customized based upon factors such as the customer's prior purchasing activities.

The coupons can also be customized based upon factors such as the gender, age and address of the person using the coupon generation and redemption system. It is also possible to customize the coupons by product and/or brand preferences that are provided by the customer.

Coupons generated using the coupon generation and redemption system may have a short time of validity before expiration, such as expiring on the same day that the coupon is generated.

Through the use of a time of validity that is much shorter than conventional manufacturer and store coupons, the coupon generation and redemption system supports both the retailer and product manufacturer objective of achieving an immediate call to action and the related purchase of a featured item.

The value of the coupon may be variable depending on factors such as prior purchasing activities of the consumer that is desiring to print the coupon or the prior purchasing activities of the group of consumers that use the coupon generation system.

The value of the coupon may also vary depending on the time since the coupon has been generated and/or the time until the coupon expires. For example, during each increment of time since the coupon was generated, the value of the coupon may decrease.

An aspect in efficiently operating the coupon generation and redemption system is efficiently defining the coupons. One suitable technique for defining the coupons is to provide the advertiser with a tool that the advertiser uses to define the coupons.

In one such configuration, the advertiser is provided with a template that is to be used when defining the coupons. While it is possible for the template to be provided on conventional paper, providing the template in a computer form may enhance the efficiency of creating the coupons because such a system minimizes the time that must be expended by the entity that is operating the coupon generating and redemption system to get the coupons into the interface that is used by the customer.

In certain embodiments, the template may include the identity of the product on which the discount is applicable and the amount of the discount. The identity of the product may include the name of the product. An image of the product may also be provided to assist the customer in locating the product that is associated with the coupon.

The template may also include the time period in which the coupon is valid. Since it is desired for the coupon generation and redemption system to function as an immediate call to action, the coupon may be valid for a relatively short period of time after the coupon is generated.

In one such configuration, the coupon may be valid for less than a week from when the coupon is generated. In other embodiments, the coupon may be valid only on the day that the coupon is generated. In still other embodiments, the period in which the coupon is valid may be a few hours.

Because the coupons can readily be changed, the coupon generation and redemption system enables advertisers to promote different products at different times of the month. For example, the advertisers can promote less expensive products in the second half of the month.

When the coupon generation and redemption system is implemented using a mobile computing device, the terms of the coupons may be changed in real-time based upon factors such as the redemption rates, weather, day of the week and time of the day when it is desired to redeem the coupon.

The advertiser may also control the locations at which the coupon is valid. For example, the coupon may only be valid at a particular retailer. It is also possible for the advertiser to limit the validity of the coupon to a particular location of the particular retailer.

By providing the advertiser with the ability to control many aspects of the coupon, it is possible for the advertiser to focus advertising efforts in a very focused manner. The coupon generation and redemption system also enables the advertiser to very quickly respond to particular market conditions.

For example, if the advertiser sees that the weather forecast indicates the next business day will be warm, the advertiser may distribute coupons for products that are likely to be used on such warm days.

When defining the coupons, the advertiser can also indicate how many coupons are desired to be distributed. Once the coupon distribution hits a threshold, the coupon could be removed from the coupon generation and redemption system. Alternatively, the terms of the coupon may be altered once the coupon distribution threshold is attained. For example, the value of the coupon may be decreased.

Because the coupons are suitable for electronic processing when the coupons are redeemed, the advertiser can monitor the coupon redemptions. One the coupon redemptions hit a threshold, the coupon could be removed from the coupon generation and redemption system. Alternatively, the terms of the coupon may be altered when the coupon redemption threshold is attained. For example, the value of the coupon may be decreased.

The electronic processing also enables the advertiser to monitor redemption rates so that the advertiser can determine what discounts are most effective at causing the customer to purchase the associated product. Alternatively or additionally, the advertiser can utilize a revenue maximization model that is similar to the techniques used by airlines to price airplane tickets. This revenue maximization model can correlate the total amount of sales derived from certain coupon values to maximize profit for the advertiser.

Once the advertiser defines the coupon, the coupon may be uploaded to a database that is maintained by or for the company that operates the coupon generation and redemption system. For example, when the coupon is defined using a web portal, the coupon data may be transmitted through the internet. The coupon may then be downloaded to each of the coupon generation and redemption systems.

To prevent unauthorized access to the coupon data, the coupon data may be encrypted when being transmitted between where the coupon is defined and the database. A person of skill in the art will appreciate that a variety of encryption techniques may be used.

Alternatively, the defined coupon may be required to be reviewed prior to publishing to the coupon generation and redemption system. By reviewing the defined coupon prior to publishing, it is possible to ensure that there are no errors in the coupon.

This review process also enables the company operating the coupon generation and redemption system to ensure that the coupon does not violate any terms in the agreement between the advertiser and the company operating the coupon generation and redemption system as well as to determine whether the coupon violates any laws or regulations. An example of one such regulation is a prohibition against providing discounts on liquor.

Data obtained from the use of coupons generated using the coupon generation and redemption system may be electronically accessible for review at the completion of a related transaction. Providing such data gives immediate control over the level of redemptions, as well as the ability to make immediate adjustments to the offer based on actual redemption experience.

In contrast, data derived from redemption of manufacturer coupons and store coupons may have delayed availability because of manual processing of such coupons.

The coupon generation and redemption system enables coupons to be electronically processed for reimbursement by the product manufacturer. Electronically processing coupons reduces the time, hassle and money typically associated with retailers and manufacturers handling a paper coupon and processing them for reimbursement through a clearinghouse.

Electronically processing coupons using the coupon generation and redemption system provides the retailer and manufacturer with greatly enhanced auditing capabilities including the day and time of each purchase, the total amount of the purchase, the other products that were purchased in the transaction and the register where the transaction was made.

When consumers attempt to redeem coupons produced using the coupon generation and redemption system, the system validates the coupon to a specific list of products, as opposed to using a manufacturer code and a more generic product family code that is typically used with manufacturer coupons.

The coupon generation and redemption system thereby avoids the potential for mis-redemptions or the prospect of fraud due to a lack of one-to-one pairing either in the redemption of the coupon by the consumer or by the retailer.

In certain embodiments, product manufacturers may only be billed based on actual redemption data with coupons produced using the coupon generation and redemption system. This pay-for-performance model is in contrast to manufacturer coupons which are pay-by-print and store coupons that are typically supported through a generalized basket of product manufacturer trade funds.

The coupon generation and redemption system may solicit input or feedback from the persons who are using the coupon generation and redemption system. Examples of such input or feedback are types or brands of products on which the customer desires to receive discounts. Other types of feedback include offering different discounts that would encourage the customer to purchase additional products.

To encourage the customers to provide input or feedback, the coupon generation and redemption system may offer the customers rewards for providing the input or feedback. Examples of such rewards include providing the customer coupons having increased value or providing the customer with access to additional coupons once the feedback has been submitted.

In another aspect of the invention, the coupon generation and redemption system enables a consumer to view available coupons in a variety of languages such that if the person using the coupon generation and redemption system is not fluent in English, the person may be able to select an alternative language in which the person is fluent.

The coupons that are selected by the person may be generated in the language that is selected by the person such that the person can readily comprehend the details of the coupon such as the product on which the discount is available and the amount of the available discount. Because the coupon is provided in a language that the person is fluent, the person is more likely to purchase the product on which the discount is available.

Additionally, at least a portion of the coupon may be presented in an alternative language that corresponds to the primary language used by the persons working at the location where the coupon is intended to be redeemed.

By providing the details of the coupon in the language used by the person working at the location where the coupon is intended to be redeemed, the coupon may be processed more efficiently that if the coupon was only printed in the language preferred by the person who is using the coupons and purchasing the associated product.

The preceding comments about providing the coupons in preferred languages for the person who will be using the coupon and the workers where the coupon is intended to be redeemed may be adapted for coupons that are printed such as using the kiosk as well as coupons that are distributed electronically such as on a mobile computer device.

In another configuration of the invention, the customer enters a list of products that are desired to be purchased into the coupon generation and redemption system. The customer may be presented with a list of the coupons or other discounts that are available for the list of products.

The list of coupons or other discounts may compare the total amount of the coupons or other discounts that are available at different retailers. This information thereby enables the customer to decide which of the retailers to purchase the items from.

In addition to or as an alternative to providing the total amount of the coupons or discounts, the coupon generation and redemption system may also provide the customer with additional information that the customer may find useful when deciding where to purchase the products.

For example, the coupon generation and redemption system may provide the total cost of the products at different retailers. The coupon generation and redemption system may also provide the customer information about the availability of the items on the shopping list at different stores.

The customer may also be able to enter the maximize number of stores that the customer is willing to go to when purchasing the items on the customer's shopping list. The coupon generation and redemption system would thereby analyze the discounts on the products from the retailers and prepare a list and associated coupons that tells the customer which products to purchase from which of the stores. It is also possible for the customer to enter the maximum distance that the customer is willing to travel to purchase all of the products on the shopping list.

Rather than relying solely upon the available coupons, the customer may request bids from a series of merchants based upon the items that are in the shopping list. The coupon generation system will forward the shopping list to the available retailers and determine which of the merchants offers the overall lowest price for all of the items in the shopping list.

The coupon generation and redemption system may present the customer with a discount on a list of items that includes more items than were on the shopping list. The list may include additional products that are complementary to or likely to be used in conjunction with the items on the shopping list. The list may also include additional items from the same manufacturer, distributor or retailer.

The manufacturer may thereby increase the amount of the purchase and/or the profitability of the purchase by encouraging the customer purchase such additional products. In situations where the initial products have a higher profit margin, the manufacturer may be willing to provide a discount on lower margin products just to increase the overall amount of the sale even though providing the customer with a discount on the lower margin products may further decrease the profit margin on such products.

On the other hand, when the customer has indicated a desire to purchase low profit margin products, the manufacturer may desire to not only increase the amount of the sale but also increase the profit margin by offering the customer a discount on the higher profit margin product that the customer did not previously indicate that the customer was interested in purchasing.

In the preceding detailed description, reference is made to the accompanying drawings, which form a part hereof, and in which is shown by way of illustration specific embodiments in which the invention may be practiced. In this regard, directional terminology, such as "top," "bottom," "front," "back," "leading," "trailing," etc., is used with reference to the orientation of the FIGURE(S) being described. Because components of embodiments can be positioned in a number of different orientations, the directional terminology is used for purposes of illustration and is in no way limiting. It is to be understood that other embodiments may be utilized and structural or logical changes may be made without departing from the scope of the present invention. The preceding detailed description, therefore, is not to be taken in a limiting sense, and the scope of the present invention is defined by the appended claims.

It is contemplated that features disclosed in this application, as well as those described in the above applications incorporated by reference, can be mixed and matched to suit particular circumstances. Various other modifications and changes will be apparent to those of ordinary skill.

The invention claimed is:

1. A coupon generation and redemption method comprising:
    setting a redemption value of at least one coupon based upon at least one of a day on which the at least one coupon is printed, a time of day on which the at least one coupon is printed, a day on which the at least one coupon is redeemable and a time of day on which the at least one coupon is redeemable;

displaying on a video display associated with a computing device at least one product on which at least one promotion is available;

selecting using an input device that is associated with the computing device at least one of the at least one product for which the consumer desires to receive at least one coupon;

at least one of printing the at least one coupon using the computing device and sending the at least one coupon to a mobile telephone, a mobile computing device or a notebook computer and then displaying the at least one coupon on the mobile telephone, mobile computing device or the notebook computer to which the at least one coupon was sent;

purchasing the at least one product referenced in the at least one coupon; and redeeming the at least one coupon using the printed at least one coupon or the displayed at least one coupon on the mobile telephone, the mobile computing device or the notebook computer.

2. The coupon generation and redemption method of claim 1, wherein a redemption value of the at least one coupon varies based upon the amount of time from which the at least one coupon was printed using the computing device.

3. The coupon generation and redemption method of claim 1, wherein a redemption value of the at least one coupon is determined by the prior purchasing activities of the consumer that prints the at least one coupon using the computing device.

4. The coupon generation and redemption method of claim 1, wherein a redemption value of the at least one coupon is determined by the prior purchasing activities of a group of consumers that have printed the at least one coupon using the computing device.

5. The coupon generation and redemption method of claim 1, wherein the computing device is in a kiosk located in the store at which the at least one coupon is redeemable.

6. The coupon generation and redemption method of claim 1, and further comprising electronically processing the at least one coupon for reimbursement.

7. The coupon generation and redemption method of claim 6, wherein electronically processing the at least one coupon comprises comparing the at least one product referenced on the at least one coupon to the list of products sold at the store where the at least one coupon is redeemed.

8. The coupon generation and redemption method of claim 1, wherein the at least one coupon is only redeemable at particular stores.

9. The coupon generation and redemption method of claim 1, wherein the at least one coupon includes information on a location in the store in which the at least one product referenced in the at least one coupon may be located.

10. The coupon generation and redemption method of claim 1, wherein the at least one coupon is printed by the computing device proximate to a time when the at least one coupon is to be redeemed to encourage the consumer to select the at least one product referenced in the at least one coupon.

11. The coupon generation and redemption method of claim 1, wherein the at least one coupon has a short period of time in which the at least one coupon may be redeemed.

12. The coupon generation and redemption method of claim 1, and further comprising associating the at least one coupon with a credit card, a debit card or an affinity card.

13. The coupon generation and redemption method of claim 1, wherein the computing device is located at a store where the at least one product is being sold.

14. The coupon generation and redemption method of claim 1, wherein the at least product comprises a low profit margin product and wherein the method further comprises:

displaying on the video display at least one promotion on a high profit margin product;

printing the at least one coupon on the high profit margin product;

purchasing the high profit margin product; and redeeming the at least one coupon on the high profit margin product.

15. The coupon generation and redemption method of claim 1, and further comprising:

selecting at least one language in which a consumer desires to communicate;

displaying information regarding the at least one promotion in the selected language; and printing the at least one coupon in the selected language.

16. The coupon generation and redemption method of claim 1, and further comprising soliciting user feedback regarding the at least one coupon and providing a user with at least one of an additional coupon or an enhanced value on the at least one coupon as a reward for a user providing feedback.

17. The coupon generation and redemption method of claim 1, and further comprising at least one of comparing a total discount for the at least one coupon at a first store and a second store and comparing a price of a first product after applying the at least one coupon at a first store and a second store.

* * * * *